United States Patent [19]
Walker et al.

[11] Patent Number: 5,413,178
[45] Date of Patent: May 9, 1995

[54] METHOD FOR BREAKING STABILIZED VISCOSIFIED FLUIDS

[75] Inventors: Michael L. Walker; Chris E. Shuchart, both of Duncan, Okla.

[73] Assignee: Halliburton Company, Duncan, Okla.

[21] Appl. No.: 226,793

[22] Filed: Apr. 12, 1994

[51] Int. Cl.$^6$ .............................................. E21B 43/26
[52] U.S. Cl. .................................. 166/300; 166/308; 507/903; 507/921; 507/922
[58] Field of Search ...................... 166/278, 300, 305.1, 166/308; 252/8.551

[56] References Cited

U.S. PATENT DOCUMENTS

| | | |
|---|---|---|
| 3,146,200 | 8/1964 | Goldstein et al. |
| 5,067,565 | 11/1991 | Holtmyer et al. ............... 166/305.1 |
| 5,110,486 | 5/1992 | Manalastas et al. ............ 166/308 X |
| 5,145,012 | 9/1992 | Hutchins et al. ............... 166/300 X |

*Primary Examiner*—George A. Suchfield
*Attorney, Agent, or Firm*—Robert A. Kent

[57] ABSTRACT

The present invention relates to a method of controllably breaking an aqueous based viscosified fluid containing a gel stabilizer such as sodium thiosulfate, when the fluid is within a subterranean formation having a temperature above about 175° F. The method is accomplished by the incorporation of a particular selected breaker comprising an alkali metal chlorite or hypochlorite in the viscosified fluid containing the gel stabilizer. The method is particularly effective in providing a controlled break in a treatment fluid introduced into a subterranean formation having a static temperature in the range of from about 200° F. to about 300° F.

14 Claims, No Drawings

METHOD FOR BREAKING STABILIZED VISCOSIFIED FLUIDS

BACKGROUND OF THE INVENTION

1. Field Of The Invention

The present invention relates to compositions and methods for treating subterranean formations. Specifically, the invention is directed to compositions used to break fracturing fluids utilized in the stimulation of subterranean formations.

2. Description Of The Prior Art

It is common practice to treat subterranean formations to increase the gross permeability or conductivity of such formations by procedures which are identified generally as fracturing processes. For example, it is a conventional practice to hydraulically fracture a well in order to produce one or more cracks or "fractures" in the surrounding formation by mechanical breakdown of the formation. Fracturing may be carried out in wells which are completed in subterranean formations for virtually any purpose. The usual candidates for fracturing, or other stimulation procedures, are production wells completed in oil and/or gas containing formations. However, injection wells used in secondary or tertiary recovery operations, for example, for the injection of water or gas, may also be fractured in order to facilitate the injection of fluids into such subterranean formations.

Hydraulic fracturing is accomplished by injecting a hydraulic fracturing fluid into the well and applying sufficient pressure on the fracturing fluid to cause the formation to break down with the attendant production of one or more fractures. The fracture or fractures may be horizontal or vertical, with the latter usually predominating, and with the tendency toward vertical fracture orientation increasing with the depth of the formation being fractured. Usually a gel, an emulsion or a foam, having a proppant such as sand or other particulate material suspended therein is introduced into the fracture. The proppant is deposited in the fracture and functions to hold the fracture open after the pressure is released and the fracturing fluid flows back into the well. The fracturing fluid has a sufficiently high viscosity to retain the proppant in suspension or at least to reduce the tendency of the proppant to settle out of the fracturing fluid as the fracturing fluid flows along the created fracture. Generally, a gelation agent and/or an emulsifier is used to gel or emulsify the fracturing fluid to provide the high viscosity needed to realize the maximum benefits from the fracturing process.

When the fracturing fluid is to be utilized in a formation having a temperature above about 175° F., and particularly those formations having a temperature above about 225° F., a stabilizer is added to the gel. The stabilizer generally functions to scavenge oxygen from the fluid and to assist in preventing premature gel degradation. The use of sodium thiosulfate and similar compounds as gel stabilizers is well known in the art. The method is described in, for example, U.S. Pat. No. 3,146,200.

After the high viscosity fracturing fluid has been pumped into the formation and fracturing of the formation occurred, it is desirable to remove the fluid from the formation to allow hydrocarbon production through the new fractures. Generally, the removal of the highly viscous fracturing fluid is realized by "breaking" the gel or emulsion or, in other words, by converting the fracturing fluid into a low viscosity fluid. Breaking the gelled or emulsified fracturing fluid has commonly been accomplished by adding a "breaker," that is, a viscosity-reducing agent, to the fracturing fluid prior to pumping into the subterranean formation. However, this technique can be unreliable and sometimes results in incomplete breaking of the fluid, particularly when gel stabilizers are present and/or premature breaking of the fluid before the fracturing process is complete.

Conventional oxidizing breakers such as sodium or ammonium persulfate are useful to reduce the viscosity of a fracturing fluid at temperatures up to about 175°–200° F., but tend to cause the fluid to break too rapidly at higher temperatures resulting in premature loss of viscosity. Premature breaking can decrease the number or length of fractures obtained and thus, the amount of hydrocarbon recovery.

The incorporation of a gel stabilizer into a fracturing fluid to provide high temperature stability often interferes with the ability of a breaker to provide a desired viscosity reduction in the fracturing fluid and the breaker sometimes interferes with the ability of the stabilizer to stabilize the gel for the desired period of time within the subterranean formation. Further, it is known in the art that most fracturing fluids will break if given enough time at an elevated temperature even in the presence of a gel stabilizer. However, it is, of course, most desirable to return the well back to production as quickly as possible, therefore, it generally is desired to break a gel within 6 to 24 hours after introduction into a subterranean formation.

There remains a need for a method for effecting controlled breaking of a fracturing fluid when a gel stabilizer is present.

SUMMARY OF THE INVENTION

The present invention relates to a method for controllably breaking an aqueous based fracturing or treatment fluid utilized to stimulate an elevated temperature subterranean formation. The present invention particularly relates to a method of controllably breaking a fracturing or treatment fluid containing a gel stabilizer, such as, sodium thiosulfate when the fluid is at a temperature above about 175° F. The method is accomplished by the incorporation of an effective amount of an alkali metal chlorite or hypochlorite in the fracturing fluid whereby a desired break time may be achieved. The method of the present invention is particularly effective in providing a controlled break of a fracturing fluid at temperatures above about 225° F.

DESCRIPTION OF THE PREFERRED EMBODIMENT

The method and composition of the present invention provides a means of breaking an aqueous linear or crosslinked fracturing fluid used to stimulate an elevated temperature subterranean formation. The present invention is suitable for use in a formation having a temperature above about 175° F. and is particularly useful in the temperature range of from about 225° F. to about 300° F.

The aqueous fluid employed in the practice of this invention may be substantially any aqueous liquid such as fresh water, natural or synthetic brines, sea water or the like.

The viscosifying or gelling agent employed in the present invention included natural and derivatized polysaccharides which are soluble, dispersible, or swellable in an aqueous liquid to yield viscosity to the fluid. One group, for example, of polysaccharides which are suitable for use in the present invention include gum arabic, gum ghatti, gum karaya, tamarind gum, tragacanth gum, guar gum, locust bean gum and the like. Modified gums such as carboxyalkyl derivatives, like carboxymethyl guar, and hydroxyalkyl derivatives, like hydroxypropyl guar also can be employed. Doubly derivatized gums such as carboxymethylhydroxypropyl guar (CMHPG) can also be used. Modified celluloses and derivatives thereof also can be employed. There are thus literally thousands of such materials which have varying properties that can be employed in the practice of the present invention, for example, cellulose ethers, esters and the like.

In general, any of the water-soluble cellulose ethers can be used in the practice of the invention. Those cellulose ethers which can be used include, among others, the various carboxyalkyl cellulose ethers, such as carboxyethyl cellulose and carboxymethyl cellulose (CMC); mixed ethers such as carboxyalkyl ethers, such as carboxymethyl hydroxyethyl cellulose (CMHEC); hydroxyalkyl celluloses such as hydroxyethyl cellulose (HEC) and hydroxypropyl cellulose; alkyhydroxyalkyl celluloses such as methylhydroxypropyl cellulose; alkyl celluloses such as methyl cellulose, ethyl cellulose and propyl cellulose; alkylcarboxyalkyl celluloses such as ethylcarboxymethyl cellulose; and alkylalkyl celluloses such as methylethyl cellulose; and hydroxyalkylalkyl celluloses such as hydroxypropylmethyl cellulose; and the like. A preferred derivatized cellulose is a hydroxyethyl cellulose grafted with vinyl phosphonic acid such as disclosed in U.S. Pat. No. 5,067,565. The entire disclosure of which is incorporated herein by reference. Most preferred polysaccharides are the galactomanans, modified or derivative galactomanans, and cellulose derivatives, examples of which are given above.

The chemistry and materials involved in the preparation of polysaccharide gelled fluids of the type described above is well understood in the art. As is well understood, the amount of gelling or viscosifying agent employed in the aqueous gel depends upon the desired viscosity of the solution. The gelling agent generally is present in an amount of from about 10 to about 100 pounds per 1000 gallons of fluid. The preferred concentration is in the range of from about 20 to about 60 pounds per 1000 gallons of fluid.

The fluid may include a crosslinking agent to further enhance the development of viscosity by crosslinking the gelling agent in the fluid. The crosslinking agent can comprise a borate releasing compound or any of the well known transition metal ions which are capable of creating a crosslinked structure with the particular gelling agent utilized. Examples of such crosslinking agents sources include a borate releasing compound such as sodium tetraborate, aluminum, zirconium or titanium chelates, antimony compounds and the like. The crosslinking agent can be controlled to permit introduction of the fluid into a wellbore before the viscosity significantly increases.

The fluid includes an effective amount of a gel stabilizer to stabilize the fluid against premature viscosity loss when introduced into an elevated temperature formation. The gel stabilizer can comprise oxygen scavengers such as an alkali metal thiosulfate and preferably comprises sodium thiosulfate. The gel stabilizer generally is present in an amount of from about 3 to about 50 pounds per 1000 gallons of fluid.

The fluid also may include any of the other conventional additives such as proppants, pH control agents, bactericides, clay stabilizers, surfactants and the like which do not adversely react with the other constituents to inhibit performance of the desired treatment upon a subterranean formation.

The breaker system for the gelled fluid comprises an effective amount of at least one compound selected from the group consisting of calcium hypochlorite and alkali metal chlorites or hypochlorites in at least partially water soluble form.

The amount of breaker employed is that amount required to reduce the viscosity of the stabilized gelled fluid at a temperature above about 175° F. to a preselected lower viscosity or to a complete break as most desired within a desired period of time. The optimum or effective amount of breaker employed in the present invention depends on factors such as the injection period desired, the particular gelling agent and its concentration, the stabilizer and its concentration, the particular breaker and the formation temperature as well as other factors. Typically, however, from about 0.1 to about 30 pounds of the chlorite breaker is employed per 1000 gallons of fluid. Most preferably, to achieve a desired break in from about 6 to 24 hours in the fluid, from about 1 to about 10 pounds of chlorite is employed per 1000 gallons of fluid.

To further illustrate the present invention, but not by way of limitation, the following examples are provided.

EXAMPLE I

Static break tests were performed to evaluate break capability in fluid systems containing sodium thiosulfate, dithionite or sulfite as a gel stabilizer for elevated temperature applications. The gel was prepared by adding to tap water the following, in the sequence listed, 2 gal/1000 gal "CLAYFIX II" clay stabilizer, 40 lbs/1000 gal carboxymethylhydroxypropyl guar, 2.5 lbs/1000 gal fumaric acid and 10 lbs/1000 gal sodium carbonate for buffering, 20 lbs/1000 gal sodium thiosulfate or other stabilizer and 0.4 gal/1000 gal Zr crosslinker. The gelling agent was permitted to hydrate for approximately 30 minutes prior to addition of the buffer and other constituents. The breakers identified in the table below in the amounts specified then were added and the samples were placed into "BAROID" pressure cells, pressurized to 100 psi with nitrogen, and placed in a preheated oil bath maintained at 275° F. After two hours the samples were cooled to room temperature by immersion in a cool water bath for one hour, the viscosity determined and the samples returned to the test equipment for 22 additional hours at 275° F. Viscosity, when determined, was measured on a "FANN" Model 35 viscometer. The fluid pH was determined with an Orion Combination pH Probe Model No. 91-05. If the fluid was crosslinked a visual evaluation was utilized to evaluate the extent of the crosslink. The data from the tests is set forth in Tables I, II and III.

The data set forth in Table II in which no gel stabilizer is present in the fluids is presented for comparison purposes.

The data in Table III illustrates the effect with sodium dithionite and sodium sulfite as the gel stabilizer when sodium chlorite is utilized as the breaker.

TABLE I

| Sample No. | Breaker | Breaker lbs/1000 gal | 2 hour Viscometer Dial Reading at 511 Sec$^{-1}$ | pH | 24 hour Viscometer Dial Reading at 511 Sec$^{-1}$ | pH |
|---|---|---|---|---|---|---|
| 1 | $Na_2MoO_4$ | 30 | SC | 9.63 | IC | 9.88 |
| 2 | $NaNO_2$ | 10 | SC | 9.31 | IC | 9.54 |
| 3 | $CeO_2$ | 20 | SC | 9.54 | IC+** | 9.52 |
| 4 | MTBE* | 62 | SC | 9.46 | IC+ | 8.97 |
| 5 | $K_2Cr_2O_7$ | 30 | WC | 9.54 | 7** | 9.75 |
| 6 | $KMnO_4$ | 15 | 8 | 9.12 | 6 | 8.08 |
| 7 | $NaClO_4$ | 14 | SC | 9.12 | IC | 9.62 |
| 8 | $NaClO_3$ | 10 | SC | 9.54 | IC+ | 9.73 |
| 9 | $NaClO_2$ | 10 | SC | 7.02 | 16** | 7.20 |
| 10 | NaClO | 1% by wt of 3% solution | SC | 8.64 | IC | 9.02 |
| 11 | NaClO | 2% by wt of 3% solution | SC | 8.67 | WC | 8.88 |
| 12 | $Na_2S_2O_8$ | 25 | 2 | 4.23 | — | — |
| 13 | $Na_2S_2O_8$ | 1 | WC | 9.68 | 11 | 9.98 |

*MTBE: methyl-t-butyl ether
**18 hour reading
SC: strong crosslink in gel (1" lipping capability)
IC: intermediate crosslink (less than 1" lipping capability)
IC+: stronger than IC but less than SC
WC: weak crosslink, non-lippable gel

TABLE II

| Sample No. | Breaker | Breaker lbs/1000 gal | 2 hour Viscometer Dial Reading at 511 Sec$^{-1}$ | pH | 24 hour Viscometer Dial Reading at 511 Sec$^{-1}$ | pH |
|---|---|---|---|---|---|---|
| 14 | None | 0 | SC | 9.63 | 7 | 8.61 |
| 15 | $NaClO_4$ | 14 | SC | 9.28 | 8 | 9.36 |
| 16 | $NaClO_3$ | 12 | SC | 8.18 | 7 | 9.20 |
| 17 | $NaClO_2$ | 10 | 10 | 9.28 | 3 | 7.02 |
| 18$^£$ | $Na_2S_2O_8$ | 5 | 2 | 9.52 | — | — |
| 19$^£$ | $Na_2S_2O_8$ | 1 | 5 | 10.02 | — | — |
| 20$^£$ | $Na_2S_2O_8$ | 0.5 | 6 | 10.10 | — | — |
| 21 | NaClO | 1% by wt of 3% solution | 2 | 8.99 | — | — |
| 22 | NaClO | 2% by wt of 3%4 solution | 2 | 8.42 | — | — |

$£$ addition 7 lbs/1000 gal sodium carbonate to adjust pH
SC: strong crosslink in gel (1" lipping capability)
IC: intermediate crosslink (less than 1" lipping capability)
IC+: stronger than IC but less than SC
WC: weak crosslink, non-lippable gel

TABLE III

| Sample No. | Breaker | Breaker lbs/1000 gal | 2 hour Viscometer Dial Reading at 511 Sec$^{-1}$ | pH | 24 hour Viscometer Dial Reading at 511 Sec$^{-1}$ | pH |
|---|---|---|---|---|---|---|
| 23$^1$ | $NaClO_2$ | 10 | IC | 5.54 | 5 | — |
| 24$^2$ | $NaClO_2$ | 10 | 14 | 6.55 | 2 | 7.14 |

1. gel stabilizer - sodium sulfite, $NaSO_3$ 16 #/1000 gal
2. gel stabilizer - sodium dithionite, $Na_2S_2O_4$ 22.5 #/1000 gal The data set forth above clearly illustrates the benefits achievable through use of the present invention. Gelled fluids having less than an intermediate crosslinked IC character after two hours at an elevated temperature without shearing such as in the above tests are considered unsuitable as they will not adequately transport and place a proppant material in a subterranean formation. Gelled fluids having more than about a viscometer reading of 16–18 after 24 hours are considered to be unsuitable as they have failed to achieve the desired break within a 24 hour period.

The tests illustrated in Tables I and II demonstrate that an interaction occurs between the chlorite and hypochlorite and thiosulfate that does not occur between the other oxidation states of chlorine. In the absence of sodium thiosulfate, the sodium chlorite and hypochlorite rapidly break the gel at 275° F. The other compounds do not vary in effectiveness as breakers significantly from a sample containing no breaker or gel stabilizer. The lack of favorable interaction between persulfate and the thiosulfate is demonstrated by tests 12 and 13 and 18–20. The persulfate rapidly breaks the gel to unacceptable levels even in the presence of gel stabilizer.

Table III illustrates the lack of favorable interaction between the chlorites and other gel stabilizers.

EXAMPLE II

The test procedure set forth in Example I was repeated for a fluid having the composition set forth below:
  40 lbs/1000 gal hydroxypropylguar
  2 gal/1000 gal "CLAYFIX II" clay stabilizer
  0.2 gal/1000 gal 50:50 by weight mix acetic acid/sodium acetate
  10 lbs/1000 gal sodium thiosulfate
  50% caustic solution to adjust pH to specified level
  6 gal/1000 gal borate crosslinker

TABLE IV

| Sample No. | Breaker | Breaker lbs/1000 gal | Initial pH | 2 hour Viscometer Dial Reading at 511 Sec$^{-1}$ | pH | 24 hour Viscometer Dial Reading at 511 Sec$^{-1}$ | pH |
|---|---|---|---|---|---|---|---|
| 1 | NaClO$_2$ | 3 | 12.40 | WC | 11.97 | 5 | 10.61 |
| 2 | NaClO$_2$ | 1 | 12.40 | SC | 12.04 | 8 | 11.37 |
| 3 | None | 0 | 12.40 | SC | 12.10 | SC | 11.86 |
| 4 | None | 0 | 11.53 | SC | 9.23 | WC | 8.79 |
| 5 | NaClO$_2$ | 1 | 11.53 | SC | 9.09 | 13 | 8.34 |

The test data clearly illustrates the ability of the present method to controllably break a borate crosslinked gelled fluid at an elevated temperature.

While that which is considered to comprise the preferred embodiments of the present invention has been described herein, it is to be understood that various other modifications will be apparent to and can be readily made by those skilled in the art without departing from the spirit or scope of the present invention as set forth in the appended claims.

What is claimed is:

1. A method of treating a subterranean formation penetrated by a wellbore wherein the static temperature of a zone of the formation adjacent the wellbore is above about 175° F. comprising:
   injecting into the wellbore and into contact with said formation an aqueous fluid comprising (i) an aqueous liquid, (ii) a viscosity increasing amount of a gelling agent comprising at least one member selected from the group consisting of galactomanans, modified or derivatized galactomanans and cellulose derivatives, (iii) a crosslinker for said gelling agent, (iv) a gel stabilizing effective amount of a stabilizer comprising at least one member selected from the group of alkali metal thiosulfates and (v) a breaker comprising at least one member selected from the group of alkali metal chlorites and hypochlorites and calcium hypochlorite present in an amount sufficient to effect a controlled reduction in the viscosity of the aqueous fluid after a period of time within the zone of the formation.

2. The method of claim 1 wherein the breaker is present in an amount of from about 0.1 to about 30 lbs per 1000 gallons of fluid.

3. The method of claim 1 wherein the gel stabilizer is present in an amount of from about 3 to about 50 lbs per 1000 gallons of fluid.

4. The method of claim 1 wherein said zone has a static temperature above about 225° F.

5. The method of claim 1 wherein said crosslinker comprises at least one member selected from the group of borate-releasing compounds, a source of titanium ions, a source of zirconium ions, a source of antimony ions and a source of aluminum ions.

6. The method of claim 1 wherein said gelling agent comprises at least one member selected from the group of guar, hydroxypropyl guar, carboxymethylhydroxypropylguar, carboxymethylhydroxyethyl cellulose, carboxymethyl cellulose and hydroxyethylcellulose grafted with vinyl phosphonic acid.

7. The method of claim 1 wherein said gel stabilizer is present in an amount of from about 3 to about 50 lbs per 1000 gallons of fluid and said breaker is present in an amount of from about 1 to about 10 lbs per 1000 gallons of fluid when said zone has a static temperature above about 225° F.

8. A method of fracturing a subterranean formation penetrated by a wellbore wherein the static temperature of the formation adjacent said wellbore is above about 175° F., comprising injecting into the wellbore and into contact with the formation at a rate and pressure sufficient to fracture the formation an aqueous fluid comprising:
   a) an aqueous liquid;
   b) a gelling agent comprising at least one member selected from the group of galactomanans, modified or derivatized galactomanans, and cellulose derivatives present in an amount sufficient to increase the viscosity of said aqueous liquid;
   c) a crosslinking agent for said gelling agent present in an amount sufficient to effect crosslinking of said gelling agent in said aqueous liquid to further increase the viscosity of said aqueous liquid;
   d) a gel stabilizer comprising at least one member selected from the group of alkali metal thiosulfates present in an amount sufficient to stabilize the crosslinked gel viscosity for a desired period of time; and
   e) a breaker comprising at least one member selected from the group of alkali metal chlorites and hypochlorites present in an amount sufficient to effect a controlled reduction in the viscosity of the crosslinked gelling agent of the aqueous liquid after a predetermined period of time.

9. The method of claim 8 wherein the breaker is present in an amount of from about 1 to about 10 lbs per 1000 gallons of fluid.

10. The method of claim 8 wherein the gel stabilizer is present in an amount of from about 3 to about 50 lbs per 1000 gallons of fluid.

11. The method of claim 8 wherein said crosslinker comprises at least one member selected from the group of borate-releasing compounds, a source of titanium ions, a source of zirconium ions, a source of antimony ions and a source of aluminum ions.

12. The method of claim 8 wherein said gelling agent comprises at least one member selected from the group of guar, hydroxypropyl guar, carboxymethylhydroxypropylguar, carboxymethylhydroxyethyl cellulose, carboxymethyl cellulose and hydroxyethylcellulose grafted with vinyl phosphonic acid.

13. The method of claim 8 wherein said subterranean formation has a static temperature above about 225° F.

14. The method of claim 8 wherein said subterranean formation has a static temperature in the range of from about 225° F. to about 300° F.

* * * * *